(12) United States Patent
Jo

(10) Patent No.: US 8,149,962 B2
(45) Date of Patent: Apr. 3, 2012

(54) ESTIMATING FREQUENCY SHIFT

(75) Inventor: Yung-Hoon Jo, Seongnam (KR)

(73) Assignee: Core Logic, Inc., Seoul (KR)

( * ) Notice: Subject to any disclaimer, the term of this patent is extended or adjusted under 35 U.S.C. 154(b) by 602 days.

(21) Appl. No.: 12/355,714

(22) Filed: Jan. 16, 2009

(65) Prior Publication Data
US 2009/0185646 A1      Jul. 23, 2009

(30) Foreign Application Priority Data
Jan. 17, 2008   (KR) .................. 10-2008-0005339

(51) Int. Cl.
*H04L 27/06* (2006.01)
(52) U.S. Cl. ........ 375/343; 375/260; 375/340; 375/344; 370/203; 370/204; 370/206; 370/208; 370/210; 370/480
(58) Field of Classification Search .................. 375/260, 375/340, 343, 344; 370/203, 204, 206, 208, 370/210, 480
See application file for complete search history.

(56) References Cited

U.S. PATENT DOCUMENTS
6,720,824 B2 *   4/2004   Hyakudai et al. ............. 329/304
* cited by examiner

*Primary Examiner* — Leon Flores
(74) *Attorney, Agent, or Firm* — The Nath Law Group; Joshua B. Goldberg; Stanley N. Protigal

(57) ABSTRACT

Techniques, systems and apparatus are described for estimating a frequency shift. An apparatus for estimating a frequency shift includes a fast Fourier transform unit to transform a signal of a time domain into a frequency domain and output fast Fourier transform symbols. A complex conjugate multiplier is in communication with the fast Fourier transform unit and output a continual pilot correlation between every two of the fast Fourier transform symbols output from the fast Fourier transform unit. A correlation memory unit is in communication with the complex conjugate multiplier to store the continual pilot correlation output from the complex conjugate multiplier. An adder is in communication with the correlation memory unit to add the continual pilot correlations stored in the correlation memory unit and generate an output signal comprising estimated values of the frequency shift.

16 Claims, 6 Drawing Sheets

ESTIMATING FREQUENCY SHIFT

CROSS-REFERENCE TO RELATED PATENT APPLICATION

This application claims the benefit of Korean Patent Application No. 10-2008-0005339, filed on Jan. 17, 2008, in the Korean Intellectual Property Office, the disclosure of which is incorporated herein in its entirety by reference.

BACKGROUND

The present disclosure relates to wireless communication.

When modulation and/or demodulation of a frequency are performed in a wireless communication system, a frequency shift occurs. To remove the frequency shift, the frequency shift is divided into a fractional part and an integer part to estimate frequency offset of the fractional and integer parts. In general, the fractional part is estimated as a sample before or after Fast Fourier Transform (FFT) is performed, and the integer part is estimated as a sample after FFT is performed.

SUMMARY

Techniques, systems and apparatus are described for estimating a frequency shift in wireless communication. For example, frequency shift occurring during modulation and/or demodulation of a frequency in a wireless communication system can be detected and removed. Frequency shift can be accurately estimated even in a channel or shadow area having a high Doppler frequency where the frequency shift is serious, a search period is long, a symbol estimating time is short, and an area increasing problem is solved.

In one aspect, an apparatus for estimating a frequency shift includes a fast Fourier transform unit to transform a signal of a time domain into a frequency domain and output fast Fourier transform symbols. A complex conjugate multiplier is in communication with the fast Fourier transform to output continual pilot correlations between two fast Fourier transform symbols output from the fast Fourier transform unit. A correlation memory unit is in communication with the complex conjugate multiplier to store the continual pilot correlations. An adder is in communication with the correlation memory unit to add the continual pilot correlations stored in the correlation memory unit, to generate an output signal comprising estimated values of the frequency shift.

Implementations can optionally include one or more of the following features. The correlation memory unit can include a fast Fourier transform symbol memory unit of a channel estimating apparatus which estimates a channel during signal processing. The correlation memory unit can be divided into sub-memory units that use distances among continual pilots (CPs) as data lengths and are connected to one another in series. The continual pilot correlations are respectively stored in the sub-memory units. The apparatus can include an estimated value averaging unit to average the estimated values of the frequency shift with time. The estimated value averaging unit stores the estimated values in a fast Fourier transform symbol memory unit of a channel estimating apparatus that estimates a channel during signal processing to obtain an average estimated value of the frequency shift. The channel estimating apparatus can use three or more fast Fourier transform symbol memory units to estimate the channel. The first fast Fourier transform symbol memory unit of the three or more fast Fourier transform symbol memory units can be used to multiply the two fast Fourier transform symbols by a complex conjugate. The second fast Fourier transform symbol memory unit can be used to store the continual pilot correlations, and the third fast Fourier transform symbol memory unit is used by the estimation value averaging unit. The estimated value averaging unit can average the estimated values based on a received signal strength indication (RSSI). The output signal can include estimated values of a frequency shift of an integer part of the signal. The output signal can include estimated values of a frequency shift of a fractional part of the signal. An estimation period of the frequency shift of the integer part may be a carrier period from $-FFT/2$ to $+FFT/2$.

In another aspect, a signal processing apparatus can include an analog-to-digital converter (ADC) to convert a received analog signal into a digital signal. A frequency shift estimating apparatus is in communication with the analog-to-digital converter to detect a frequency shift of the digital signal. The frequency shift estimating apparatus includes a fast Fourier transform unit to transform the digital signal from time domain to frequency domain and output fast Fourier transform symbols. A complex conjugate multiplier is in communication with the fast Fourier transform unit to output continual pilot correlations for two fast Fourier transform symbols. A correlation memory unit is in communication with the complex conjugate multiplier to store the continual pilot correlations. An adder is in communication with the correlation memory unit to add the continual pilot correlations stored in the correlation memory unit and generate an output signal that includes estimated values of the frequency shift of the digital signal. A frequency offset compensator is in communication with the frequency shift estimating apparatus to compensate for the estimated frequency shift of the digital signal using at least one of the estimated values of the frequency shift. A channel estimating apparatus is in communication with the frequency shift estimating apparatus to estimate a channel for the frequency shift compensated digital signal using at least three fast Fourier transform symbol memory units.

Implementations can optionally include one or more of the following features. The frequency shift estimating apparatus may estimate a frequency shift of an integer part. The signal processing apparatus may further include a fractional part frequency shift estimating apparatus to estimate a frequency shift of a fractional part using a sample obtained before or after fast Fourier transform is performed by the fast Fourier transform unit. After the frequency shift estimating apparatus estimates the frequency shift of the integer part, the frequency shift estimating apparatus can estimate the frequency shift of the fractional part. The correlation memory unit can be divided into sub-memory units that use distances among continual pilots as data lengths and are connected to one another in series. The continual pilot correlations can be respectively stored in the sub-memory units. The correlation memory unit can include one of three or more fast Fourier transform symbol memory units. The frequency shift estimating apparatus can include an estimation value averaging unit to average the estimated values of the frequency shift with time.

In another aspect, a method of estimating a frequency shift includes performing fast Fourier transform to transform a received signal of a time domain into a frequency domain and output fast Fourier transform symbols. Two fast Fourier transform symbols are multiplied by a complex conjugate to generate continual pilot correlations between two FFT symbols. The generated continual pilot correlations are stored in a correlation memory unit. The continual pilot correlations stored in the correlation memory unit are added using an adder. An estimated value of the frequency shift is obtained with reference to values output from the adder.

Implementations can optionally include one or more of the following features. The correlation memory unit can be divided into sub-memory units which use distances among CPs as data lengths and are connected to one another in series. The continual pilot correlations can be respectively stored in the sub-memory units. The correlation memory unit can include a fast Fourier transform symbol memory unit of a channel estimating apparatus which estimates a channel during signal processing. The method can include obtaining an average of the estimated values of the frequency shift with time. The method may use a memory unit of a channel estimating apparatus to estimate a frequency shift of an integer part. A carrier period from −FFT/2 to +FFT/2 may be determined to a search period to estimate the frequency shift.

The subject matter described in this specification can potentially provide one or more of the following advantages. Because the complex conjugate multiplying unit of the frequency shift estimating apparatus uses the FFT symbol memory units in the inactive state, additional memory units are not needed. Thus, the apparatus, systems and techniques as described in this specification do not suffer from waste of the area caused by the use of additional memory units. For example, registers and matched filters are not needed in the described techniques, systems and apparatus. Also, an accurate frequency shift can be estimated even in shadow area or channel area having a Doppler frequency.

DETAILED DESCRIPTION OF THE INVENTION

In the case of Digital Video Broadcasting-Terrestrial Handhelds (DVB-TH), a frequency shift of an integer part is estimated using a continual pilot (CP) transmitted along with a sub-carrier. An integer part frequency shift estimating apparatus using the CP collects samples of sub-carriers including the CPs to estimate a frequency shift of an integer part within a range of 2 symbols using a matched filter which expresses an index of the CP as "1." However, because the integer part frequency shift estimating apparatus additionally uses the matched filter, the integer part frequency shift estimating apparatus is inefficient in terms of area.

Accordingly, the area of a frequency shift estimating apparatus can be reduced instead of increasing a frequency shift estimation time. In addition, sign bits of a CP can be collected to estimate a frequency shift. However, these methods cannot be used to accurately detect an integer part frequency shift estimation value in a channel or shadow area having a high Doppler frequency.

Alternatively, CPs can be collected with each CP having interval of 100 or more sub-carriers within a symbol instead of using a matched filter to search for a frequency shift of an integer part. This method uses only 12 CPs in the case of a FFT 2K carrier mode including 45 CPs and limits a search range to a sub-carrier index period of +/−50. Also, in this method, the interval of CPs should be increased to 100 or more sub-carriers to increase the search period. In this case, the number of CPs used within a symbol further decreases. As a result, an estimation symbol time is required to be increased in order to increase a detection rate. Furthermore, this method uses a register in order to collect and add the CPs. Thus, an area increasing problem occurs due to a capacity of the register.

Techniques systems and apparatus are described for accurately estimating the frequency shift even in a channel or shadow area having a high Doppler frequency where the frequency shift is serious, a search period is long, and a symbol estimating time is short. For example, a register having a large memory capacity and a matched filter are not need, and thus, the memory area can be considerably reduced.

Figure 1:
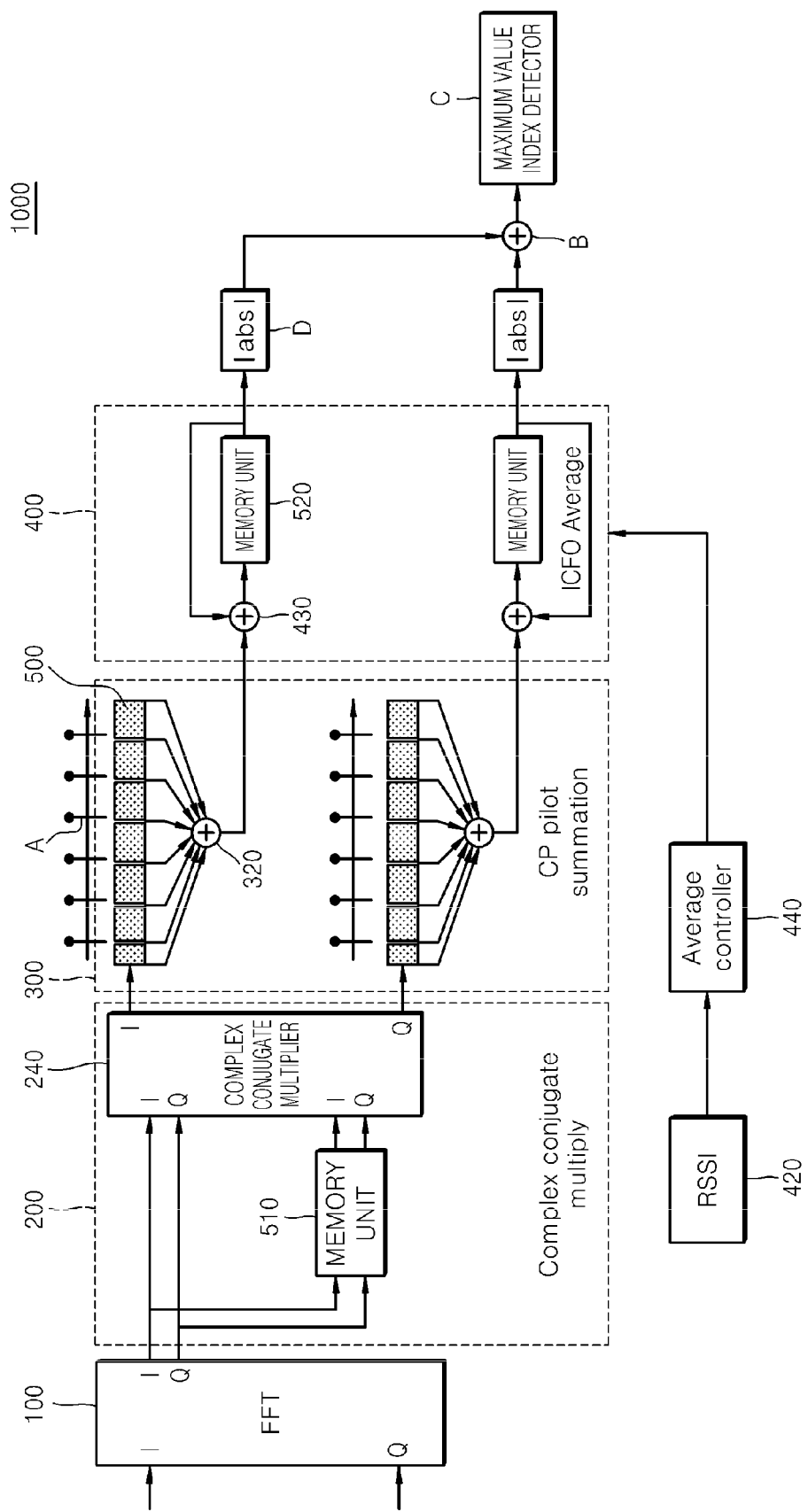
FIG. 1 is a schematic block diagram of an apparatus for estimating a frequency shift.

FIG. 1 is a schematic block diagram of a frequency shift estimating apparatus 1000. Referring to FIG. 1, the frequency shift estimating apparatus 1000 includes a signal transformer such as a Fast Fourier Transform (FFT) unit 100, a signal multiplying unit such as a complex conjugate multiplying unit 200, an adder unit 300, and an estimation value averaging unit 400.

The complex conjugate multiplying unit 200 includes a multiplier 240 and uses a memory unit 510. The adder unit 300 includes an adder 320 and uses a correlation memory unit 500. The estimation value averaging unit 400 includes an adder 430 for adding the estimation values and uses a memory unit 520 for averaging.

The FFT unit 100 transforms a received signal of a time domain into a frequency domain and sequentially outputs FFT symbols to the complex conjugate multiplying unit 200. For example, an orthogonal frequency-division multiplexing (OFDM) signal includes an in-phase (I) signal and a quadrature (Q) signal, and complex conjugate multiplying is performed for each of the I and Q signals. To perform complex conjugate multiplying, the $n^{th}$ FFT symbol is multiplied by the $(n+1)^{th}$ FFT symbol. The $n^{th}$ FFT symbol is stored in the memory unit 510, and the complex conjugate of the $n^{th}$ FFT symbol is generated and multiplied by the $(n+1)^{th}$ FFT symbol in the multiplier 240. The complex conjugate multiplying unit 200 multiplies two sequentially output FFT symbols by a complex conjugate using the multiplier 240 to output continual pilot (CP) correlations between the two FFT symbols. Here, "A" denotes CP correlations in a FFT symbol obtained by multiplying the FFT symbol by the complex conjugate.

A single symbol includes multiple CPs. Thus, multiple CP correlations is generated by complex conjugate multiplying between two symbols. For example, if a first symbol includes CPs a, b, c, and d, and a second symbol includes CPs a', b', c' and d', the CP correlations a*a', b*b', c*c', and d*d' (where a* is the complex conjugate of a) are generated by complex conjugate multiplications. The CPs are disposed at predetermined distances in one symbol. Also, the positions of the CPs in one symbol are similar to the positions of CPs in a next symbol. Therefore, the positions of CP correlations are similar to the positions of CPs of the one symbol or the next symbol. In addition, the sub-memory units have sizes corresponding to the distances between CPs or CP correlations. Furthermore, a*a', b*b', c*c', and d*d' are absolute values, and thus when a*a', b*b', c*c', and d*d' stored in the sub-memory units are summed, a dominant large value is generated.

The FFT unit 100 outputs two complex signals, i.e., an I signal and a Q signal to the multiplying unit 200, and the complex conjugate multiplying unit 200 outputs CP correlations for each of the I and Q signals. In addition to the CP correlations, correlations of general data may be output. The correlations of the general data operate as noise of the CP correlations so as to have relatively low amplitude. Thus, prominent CP correlations can be easily detected over the correlations of general data.

To generate the CP correlation, the two FFT symbols sequentially output from the FFT unit 100 are multiplied by the complex conjugate. The first FFT symbol is stored in the memory unit 510 to be delayed by 1 symbol time, and the second FFT symbol is transformed into a complex conjugate FFT symbol by the multiplier 240.

The memory unit 510 used to delay the first FFT symbol may be any type of memory unit such as a general register, etc. However, in the present embodiment, a FFT symbol memory unit used in a channel estimating apparatus of a DVB-TH may be used as the memory unit 510. The channel estimating apparatus includes an apparatus that estimates a channel which is finally preformed during the synchronization of a signal and generally uses three or more FFT symbol memory units, in particular, four FFT symbol memory units. Because the channel estimating apparatus needs three or more symbols to estimate a channel for performing symbol restoration, the channel estimating apparatus needs three or more FFT memory units to delay the at least three symbols.

However, before the channel estimating apparatus estimates the channel, the three or more FFT symbol memory units stand by in an inactive state. Because the complex conjugate multiplying unit 200 of the frequency shift estimating apparatus 1000 uses the FFT symbol memory units in the inactive state, waste of the area caused by the use of additional memory units can be reduced.

The correlation memory unit 500 stores the CP correlations using distances among continual pilots (CPs) as data lengths. The correlation memory unit 500 does not select only a specific CP in a predetermined sub-carrier period to use the predetermined sub-carrier period as a data length. The described technique is different from a conventional frequency shift estimating method of storing index information of irregular CPs in a read only memory (ROM) that stores CP correlations at each predetermined sub-carrier period. The techniques apparatus and system described in this specification do not need to store the index information of CPs in a ROM. Thus, the ROM may be removed from the apparatus. The correlation memory unit 500 is divided into fractional parts or sub-memory units, which use the distances among the CPs as the data lengths, i.e., sub-memory units which are connected to one another in series, to store the CP correlations. As a result, the CP correlations are respectively stored in the sub-memory units of the correlation memory unit 500.

Also, another FFT symbol memory unit of the channel estimating apparatus may be used as the correlation memory unit 500. Such FFT symbol memory unit does not include a register having a large memory capacity. Thus, a memory area of a signal processing apparatus can be considerably reduced than in a conventional method using a register or a matched filter.

The adder unit 300 adds the CP correlations stored in the correlation memory unit 500 using adders 320. Final output signals each having a prominent part are obtained through the summation of the CP correlations using the adders 320. The prominent parts include values corresponding to sub-carrier indexes of maximum value parts of the final output signals. The prominent parts of the final output signals are determined as estimation values of frequency shift or offset. If an estimation value of a frequency shift is equal to a predetermined reference sub-carrier index, a determination is made that the frequency shift has not occurred. If the estimation value of the frequency shift is different from the predetermined reference sub-carrier index, a frequency shift compensator compensates for the difference.

Because a signal is greatly distorted in a shadow area or a channel area having a high Doppler frequency, the frequency shift estimating apparatus 1000 may not accurately estimate a frequency shift in the shadow area or the channel area having the high Doppler frequency even through the above-described process alone. Therefore, to increase a detection rate of the frequency shift, the frequency shift estimating apparatus 1000 of the present embodiment additionally includes the estimation value averaging unit 400, which selects several estimation values to obtain an average value of the selected estimation values, so as to further accurately estimate the frequency shift.

The number of averaging operations performed by the estimation value averaging unit 400 may be controlled according to a received signal strength indication (RSSI). In other words, the number of the averaging operations may be appropriately determined according to strength of a received signal. As shown in FIG. 1, an average controller 440 may receive the RSSI from a RSSI measurer 420 to control the estimation value averaging unit 400 so as to obtain the average value of the estimation values.

A memory unit 520 is used to store the estimation values to average the estimation values. Another FFT symbol memory unit of the channel estimating apparatus may be used as the memory unit 520, for example.

Accordingly, the frequency shift estimating apparatus 1000 can use three FFT symbol memory units as the memory unit 510 which stores the FFT symbol multiplied by the conjugate complex, the memory unit 500 which stores the CP correlations, and the memory unit 520 which stores the estimation values. The frequency shift estimating apparatus 1000 does not need an additional memory unit to estimate a frequency shift of an integer part. As a result, the frequency shift estimating apparatus 1000 can considerably reduce a memory area.

After being processed through the estimation value averaging unit 400, the resultant I and Q signals are summed using an absolute value calculator "D" and an adder "B." Also, a phase of the summed signal is compensated based on the detected sub-carrier indexes. A maximum value index detector "C" determines a final frequency shift. An estimation value of the final frequency shift refers to an estimation value of a frequency shift of an integer part. The frequency shift estimating apparatus 1000 may estimate a frequency shift of a fractional part as described later with reference to FIG. 6.

Figure 2:
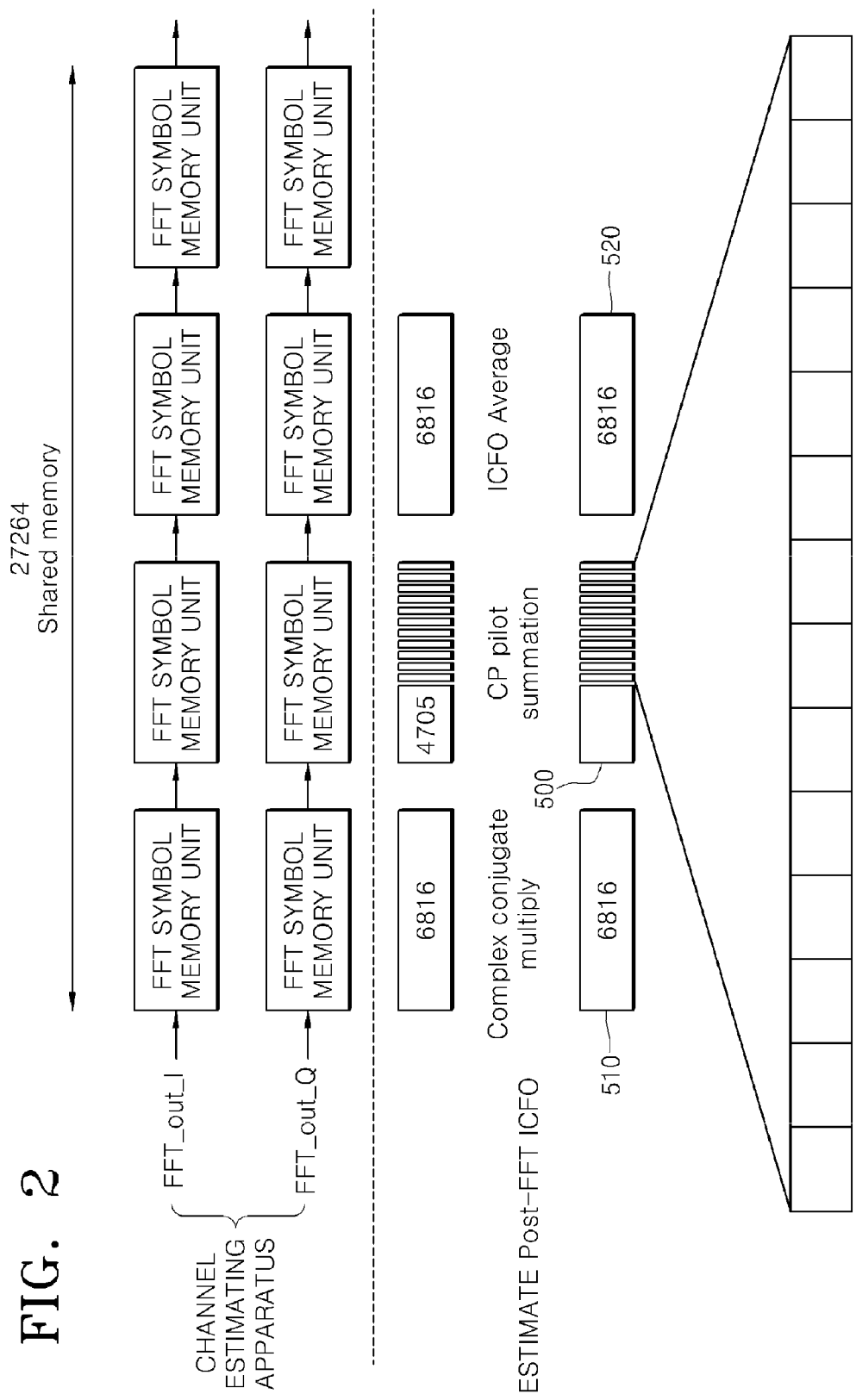
FIG. 2 illustrates Fast Fourier Transform (FFT) symbol memory units of a channel estimating apparatus used by the apparatus of FIG. 1.

FIG. 2 illustrates FFT symbol memory units of a channel estimating apparatus that can be used by the frequency shift estimating apparatus 1000 of FIG. 1. Referring to FIG. 2, FFT symbol memory units of the channel estimating apparatus are used as memory units of the frequency shift estimating apparatus 1000 of FIG. 1. At least three FFT symbol memory units can be used. FIG. 2 shows in an upper part, four FFT symbol storage units used to estimate each of the channels for the I and Q signals on which FFT has been performed. For illustrative purposes, three FFT symbol memory units are shown in a lower part of FIG. 2. These three FFT symbol memory units can be used as memory units of the frequency shift estimating apparatus 1000.

For example, the first and third FFT symbol memory units of the channel estimating apparatus can be used as the memory units 510 and 520 to store an entire symbol. The second FFT symbol memory unit can be used as the correlation memory unit 500. Unlike the first and third FFT symbol memory units, the second FFT symbol memory unit is shown to be divided into sub-memory units having distances among CPs as data lengths to store CP correlations in the respective sub-memory units. Data correlations are also stored in the sub-memory units, and the CP correlations are summed by an adder as described above.

While the FFT symbol memory units are shown to be used in regular sequential order, in practice, any of the FFT symbol memory units in the inactive state may be used as the memory units of the frequency shift estimating apparatus 1000. For example, if the channel estimating apparatus further includes a fourth an fifth FFT symbol memory unit, the fourth and fifth FFT symbol memory unit may be used in the frequency shift estimating apparatus 1000.

Figure 3A:
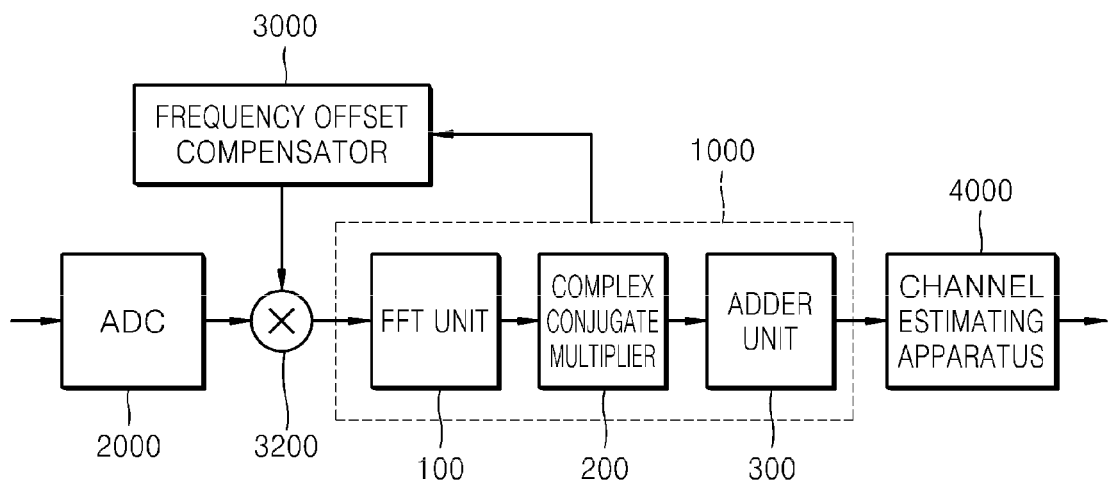
FIGS. 3A and 3B are block diagrams of signal processing apparatuses including the apparatus of FIG. 1.
Figure 3B:
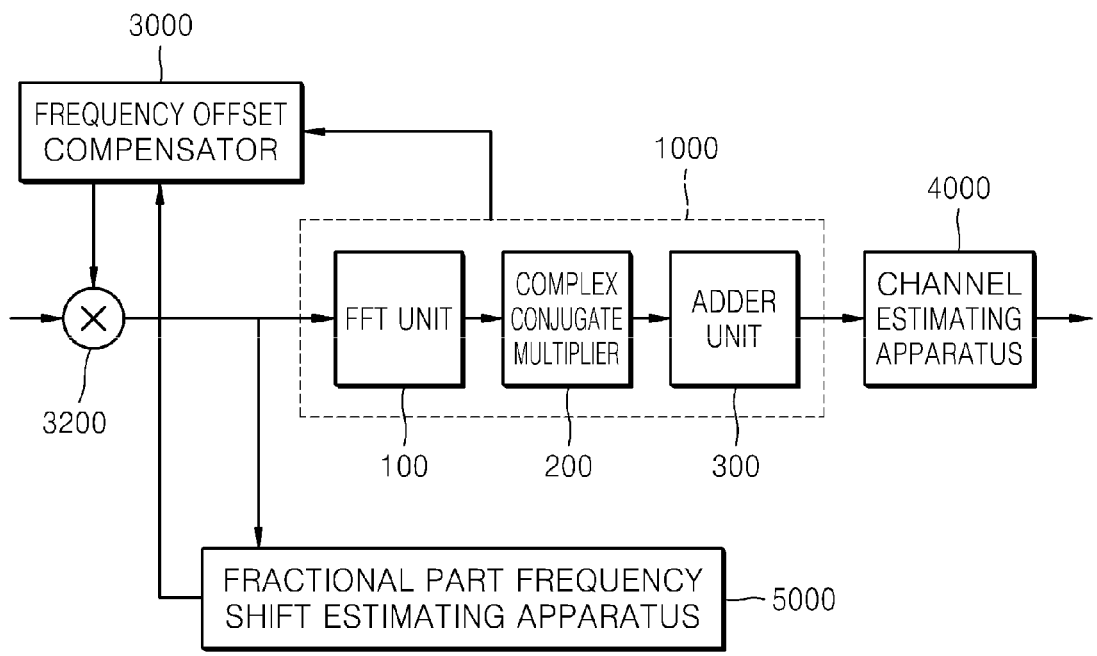

FIGS. 3A and 3B are block diagrams showing examples of a signal processing apparatus including the frequency shift estimating apparatus 1000 of FIG. 1.

Referring to FIG. 3A, the signal processing apparatus includes an analog-to-digital converter (ADC) 2000, the frequency shift estimating apparatus 1000 of FIG. 1, a frequency offset compensator 3000, and a channel estimating apparatus 4000. The ADC 2000 converts a received analog signal into a digital signal, and the frequency shift estimating apparatus 1000 estimates a frequency shift of an integer part. The frequency offset compensator 3000 compensates for frequency offset of a signal based on an estimation value estimated by the frequency shift estimating apparatus 1000. An output signal of the frequency offset compensator 3000 and an output signal of The ADC 2000 are multiplied by a complex conjugate using a multiplier 3200. Thus, the complex conjugate is calculated in the multiplier 3200. The multiplier 3200 sends an output to the frequency shift estimating apparatus 1000 to repeatedly estimate the frequency shift as needed. The channel estimating apparatus 4000 estimates a channel for the frequency offset compensated signal.

As described above, the channel estimating apparatus 4000 includes at least three FFT symbol memory units which remain in the inactive state before the channel estimating apparatus 400 estimates the channel. Those FFT symbol memory units that remain in the inactive state can be used in the frequency shift estimating apparatus 1000. This allows the signal processing apparatus as described in this specification to make efficient use of memory area or space compared to the conventional device using a matched filter or register.

FIG. 3B shows an example signal processing apparatus that estimates and compensates for frequency shifts of integer and fractional parts in a signal. The signal processing apparatus in FIG. 3B includes the components described in FIG. 3A and a fractional part frequency shift estimating apparatus 5000. The multiplier 3200 is connected to the fractional part frequency shift estimating apparatus 5000. Also, the frequency offset compensator 3000 is connected to the fractional part frequency shift estimating apparatus 5000. This allows the multiplier 3200 to send its output to the frequency shift estimating apparatus 1000 and the fractional part frequency shift estimating apparatus 5000. The fractional part frequency shift estimating apparatus 5000 sends its output to the frequency offset compensator 3000.

Estimation of the frequency shift of a fractional part may be performed before or after FFT is performed by a FFT unit (e.g., FFT unit 100). For illustrative purposes only, the following is described for the estimation of the frequency shift of the fractional part being performed before the FFT is performed.

The fractional part frequency shift estimating apparatus 5000 estimates an estimation value of the frequency shift of the fractional part. The estimated value of the frequency shift of the fractional part is input to the frequency offset compensator 3000 to compensate for frequency offset of a fractional part of a signal. This is similar to inputting the estimation value of a frequency shift of an integer part.

Each of the signal processing apparatuses of FIGS. 3A and 3B include several elements based on the frequency shift estimating apparatus 1000 of FIG. 1. However, each of the signal processing apparatuses may further include various elements such as a timing estimator, a window adjuster, an error signal remover installed after the channel estimating apparatus 4000, etc.

Figure 4:
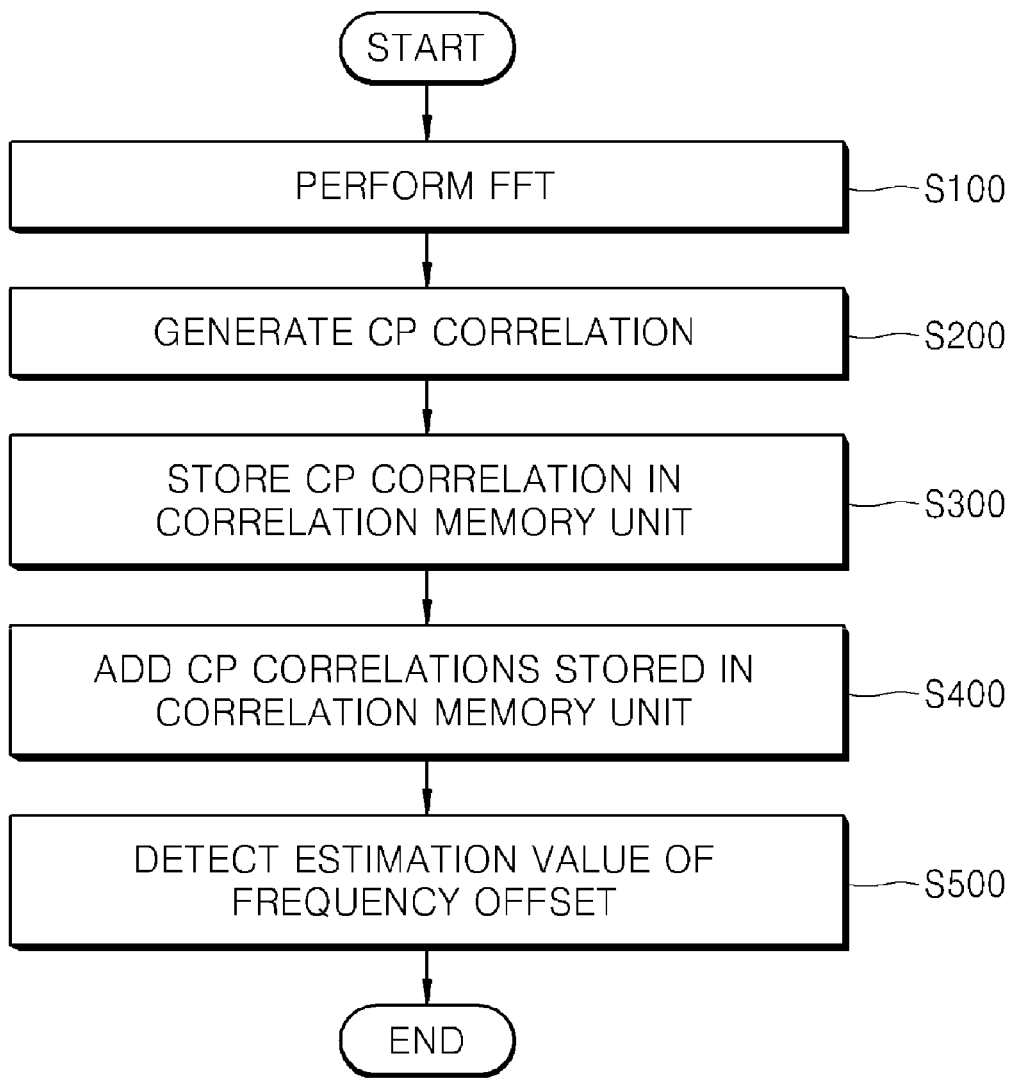
FIG. 4 is a flowchart of a method of estimating a frequency shift.

FIG. 4 is a flowchart of an example method of estimating a frequency shift. FFT is performed to transform a received signal of a time domain into a frequency domain (S100). The transformation generates FFT symbols. Two continuous FFT symbols are multiplied by a complex conjugate to generate a CP correlation between the two continuous FFT symbols (S200). A FFT memory unit of a channel estimating apparatus can be used to multiply the two continuous FFT symbols by the conjugate complex.

The CP correlation is stored in a correlation memory unit using a distance between CPs as a data length (S300). The correlation memory unit may be a FFT symbol memory unit of the channel estimating apparatus. Also, the correlation memory unit can be divided into sub-memory units and use distances among CPs as data lengths to store the CP correlations in the respective sub-memory units. The CP correlations which are stored in the sub-memory units of the correlation memory unit, are added by an adder (S400).

A sub-carrier index corresponding to a maximum one of the values output from the adder is detected to obtain an estimation value of a frequency shift (S500). As previously described, the estimation value of the frequency shift is an estimation value of a frequency shift of an integer part of the signal.

In addition, an average of the estimation values can be obtained to estimate an accurate frequency shift even in shadow area or channel area having a Doppler frequency of which frequency shift is great. A memory unit is needed to store the estimation values. The memory unit can include an inactive FFT symbol memory unit of the channel estimating apparatus. The number of averaging operations performed can be controlled based on the RSSI as previously described.

Figure 5A:
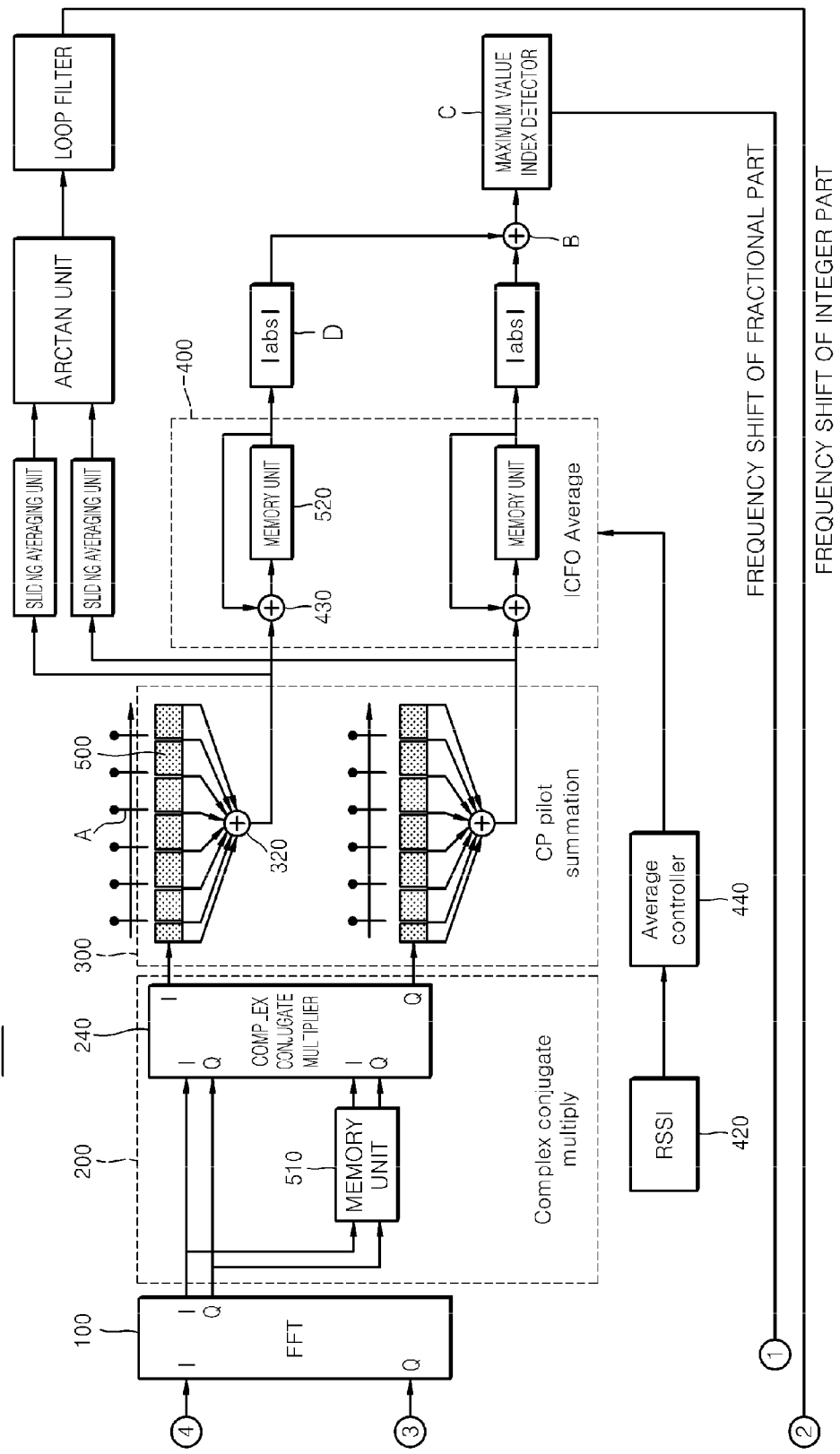
FIGS. 5A and 5B are schematic block diagrams of an apparatus for estimating a frequency shift.
Figure 5B:
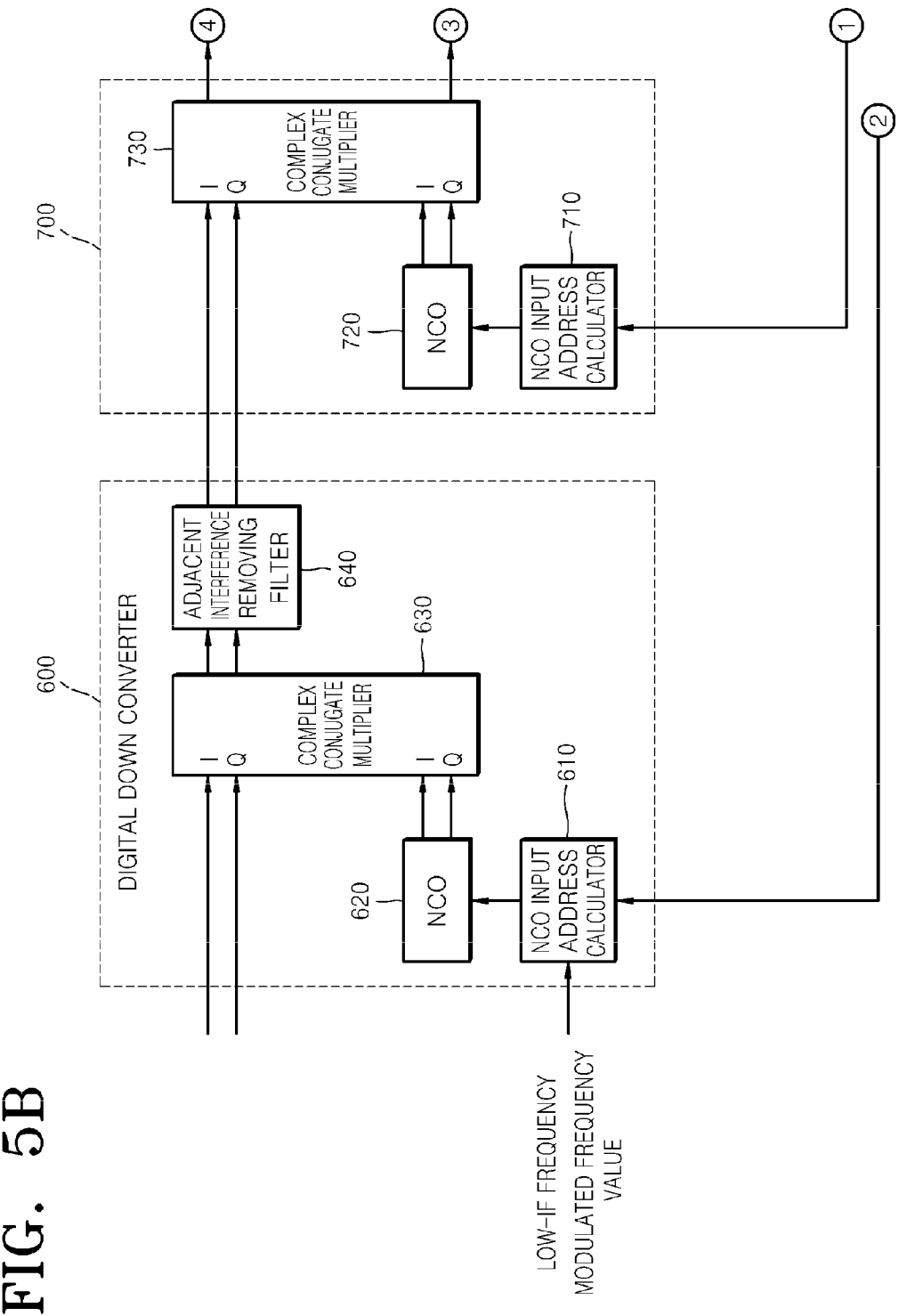

FIGS. 5A and 5B are block diagrams showing another example of a frequency shift estimating apparatus 1000 for estimating frequency shift of a fractional part. The frequency shift estimating apparatus 1000 in FIGS. 5A and 5B includes similar components as the frequency shift estimating apparatus 1000 of FIG. 1. In addition, components for estimating the frequency shift of a fractional part are included. These additional components include sliding averaging units, an ARCTAN unit, and a loop filter to estimate the frequency shift of the fractional part. First and second digital down converters 600 and 700 are included before the frequency shift estimating apparatus 1000 to compensate for a frequency shift measured through an estimation of a frequency shift of integer and fractional parts respectively.

The digital down converter 600 includes a numerical control oscillator (NCO) 620, a NCO input address calculator 610, a complex conjugate multiplier 630 and an adjacent interference removing filter 640. The NCO 620 outputs a signal to compensate for the frequency shift using an estimation value of the integer or fractional part. The NCO 620 can include a ROM that stores cosine and sine waves. The NCO input address calculator 610 outputs values from 0 to $2\pi$ for calculating the address of the stored cosine and sine waves. The NCO 620 outputs the stored cosine and sine complex waves corresponding to the values from 0 to $2\pi$ which are input from the NCO input address calculator 610. The signals of the cosine and sine complex waves output from the NCO 620 are input to the complex conjugate multiplier 630 to be restored to raw signals. The raw signals are used by the frequency shift estimating apparatus 1000 to repeat the process of estimating the frequency shift. The adjacent channel interference removing filter 640 of the first digital down converter 600 removes interference between adjacent channels. Estimation of the frequency shift of the fractional part is performed after the estimation value of the frequency shift of the integer part is obtained. The estimation value for the fractional part is obtained using techniques similar to the estimation of the frequency shift of the integer part.

FIG. 5B shows the second digital down converters 700 for estimating the frequency shift of the fractional part. The second digital down converter 700 is connected to the first digital down converter 600 and includes an NCO input address calculator 710, an NCO 720, and a complex conjugate multiplier 730.

In general, a frequency shift of an integer part can be estimated within a range of 2 symbols to 10 symbols, and a frequency shift of a fractional part can be estimated using about 30 symbols.

As described above, an accurate frequency shift can be estimated even in a shadow area or channel area having a high Doppler frequency. Also, a search period can be determined to a carrier period from −FFT/2 to +FFT/2 instead of being limited to a predetermined range like a conventional subcarrier index period of +/−50 to estimate the frequency shift. In addition, because a matched filter, a register, or the like is not used, the apparatus described in this specification does not suffer from problems associated with an increased memory area. Furthermore, the apparatus can estimate a frequency shift of a fractional part after estimating a frequency shift of an integer part. In other words, the apparatus can estimate the frequency shifts of the integer and fractional parts.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Only a few implementations and examples are described and other implementations, enhancements and variations can be made based on what is described and illustrated in this application.

What is claimed is:

1. An apparatus for estimating a frequency shift, comprising:
    a fast Fourier transform unit to transform a signal of a time domain into a frequency domain and output fast Fourier transform symbols;
    a complex conjugate multiplier in communication with the fast Fourier transform unit to output continual pilot correlations between two fast Fourier transform symbols output from the fast Fourier transform unit;
    a correlation memory unit in communication with the complex conjugate multiplier to store the continual pilot correlation output from the complex conjugate multiplier;
    an adder in communication with the correlation memory unit to add the continual pilot correlations stored in the correlation memory unit and generate an output signal comprising estimated values of the frequency shift; and
    an estimated value averaging unit to average the estimated values of the frequency shift with time, wherein the average of the estimated values is associated with strength of the signal.

2. The apparatus of claim 1, wherein the correlation memory unit comprises a fast Fourier transform symbol memory unit of a channel estimating apparatus that estimates a channel during signal processing.

3. The apparatus of claim 1, wherein the correlation memory unit is divided into sub-memory units that use distances among continual pilots (CPs) as data lengths and are connected to one another in series, wherein the continual pilot correlations are respectively stored in the sub-memory units.

4. The apparatus of claim 1, wherein the estimated value averaging unit stores the estimated values in a fast Fourier transform symbol memory unit of a channel estimating apparatus that estimates a channel during signal processing, to obtain an average estimated value of the frequency shift.

5. The apparatus of claim 4, wherein the channel estimating apparatus uses three or more fast Fourier transform symbol memory units to estimate the channel, wherein the first fast Fourier transform symbol memory unit of the three or more fast Fourier transform symbol memory units is used to multiply the two fast Fourier transform symbols by a complex conjugate, the second fast Fourier transform symbol memory unit is used to store the continual pilot correlations, and the third fast Fourier transform symbol memory unit is used by the estimated value averaging unit.

6. The apparatus of claim 4, wherein the estimated value averaging unit averages the estimated values based on received signal strength indication (RSSI).

7. The apparatus of claim 1, wherein the output signal comprises estimated values of a frequency shift of an integer part of the signal.

8. The apparatus of claim 1, wherein the output signal comprises estimated values of a frequency shift of a fractional part of the signal.

9. A signal processing apparatus comprising:
    an analog-to-digital converter to convert a received analog signal into a digital signal;
    a frequency shift estimating apparatus in communication with the analog-to-digital converter to detect a frequency shift of the digital signal comprising
        a fast Fourier transform unit to transform the digital signal from time domain to frequency domain and output fast Fourier transform symbols, a complex conjugate multiplier in communication with the fast Fourier transform unit to output continual pilot correlations for two fast Fourier transform symbols, a correlation memory unit in communication with the complex conjugate multiplier to store the continual pilot correlations, an adder in communication with the correlation memory unit to add the continual pilot correlations stored in the correlation memory unit and generate an output signal that comprises estimated values of the frequency shift of the digital signal, and an estimated value averaging unit to average the estimated values of the frequency shift with time, wherein the average of the estimated values is associated with strength of the signal;

a frequency offset compensator in communication with the frequency shift estimating apparatus to compensate for the estimated frequency shift of the digital signal using at least one of the estimated values of the frequency shift; and a channel estimating apparatus in communication with the frequency shift estimating apparatus to estimate a channel for the frequency shift compensated digital signal, wherein the channel estimating apparatus comprises at least three fast Fourier transformation symbol memory units.

10. The signal processing apparatus of claim 9, wherein:

the frequency shift estimating apparatus estimates a frequency shift of an integer part of the received signal; and the signal processing apparatus further comprises a fractional part frequency shift estimating apparatus to estimate a frequency shift of a fractional part of the received signal using a sample obtained before or after fast Fourier transform is performed by the fast Fourier transform unit.

11. The signal processing apparatus of claim 9, wherein after the frequency shift estimating apparatus estimates the frequency shift of the integer part, the frequency shift estimating apparatus estimates the frequency shift of the fractional part.

12. The signal processing apparatus of claim 9, wherein the correlation memory unit is divided into sub-memory units that use distances among continual pilots as data lengths and are connected to one another in series, wherein the continual pilot correlations are respectively stored in the sub-memory units.

13. The signal processing apparatus of claim 9, wherein the correlation memory unit comprises one of the at least three fast Fourier transform symbol memory units.

14. A method of estimating a frequency shift, comprising:

performing fast Fourier transform to transform a received signal of a time domain into a frequency domain and output fast Fourier transform symbols;

multiplying two fast Fourier transform symbols by a conjugate complex to generate continual pilot correlations between the two FFT symbols;

storing the continual pilot correlations in a correlation memory unit;

adding continual pilot correlations stored in the correlation memory unit, using an adder;

obtaining an average of the estimated values of the frequency shift with time, wherein the average of the estimated values is associated with strength of the signal; and obtaining an estimation value of the frequency shift with reference to values output from the adder.

15. The method of claim 14, wherein the correlation memory unit is divided into sub-memory units which use distances among continual pilots as data lengths and are connected to one another in series, wherein the continual pilot correlations are respectively stored in the sub-memory units.

16. The method of claim 14, wherein the correlation memory unit comprises a fast Fourier transform symbol memory unit of a channel estimating apparatus which estimates a channel during signal processing.

* * * * *